W. PIMLOTT.
HARVESTER RAKE.

No. 109,449. Patented Nov. 22, 1870.

Witnesses.
Alfred Shedlock
Boyd Eliot

Inventor.
William Pimlott

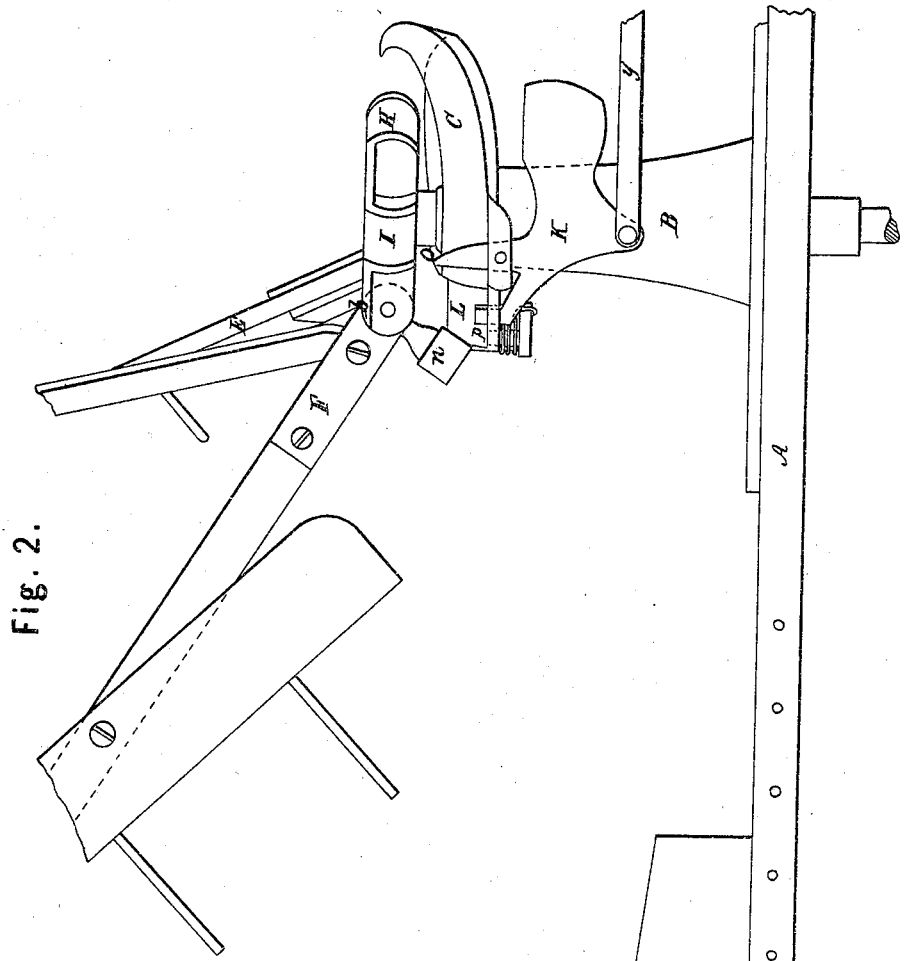

United States Patent Office.

WILLIAM PIMLOTT, OF BROCKPORT, NEW YORK.

Letters Patent No. 109,449, dated November 22, 1870.

IMPROVEMENT IN HARVESTER-RAKES.

The Schedule referred to in these Letters Patent and making part of the same.

*To all whom it may concern:*

Be it known that I, WILLIAM PIMLOTT, of Brockport, county of Monroe and State of New York, have invented a certain new and useful "Improvement in Harvesters;" and I do hereby declare the following to be a sufficiently clear and exact description of the same, that any one skilled in such matters may, by referring to the accompanying drawing and letters of reference thereon, construct and use the same.

The peculiar feature of my invention consists in a certain device or piece of mechanism, so constructed that the "gate" or "switch" for converting the reel-arms of harvesters into arms for raking the grain from the platform of such machines, may be controlled automatically by one or more of said arms, and, at the same time, be under the complete control of the operator of the machine.

Figure 2 is a similar view of the machine, but showing the rake-arm as having performed its work and one of the reel-arms in the position of completing its operation.

Like letters refer to like parts in all the views.

A is the finger-bar or front edge of the platform of the harvester.

B, the support or pedestal that carries the raking and reeling apparatus.

C, the track upon which the cams are mounted that give direction to the rake and reel-arms.

D is the head to which the rake and reel-arms are attached, only two of which are shown as at E and F, but the spaces for the others are shown at G, H, and I, there being usually only five in all upon such machines.

These arms are usually made of wood and attached as shown at E and F, to brackets $b$, of iron, at the angle of which they are pivoted to the head D by a pin or bolt through them, and upon which they work as a fulcrum.

Upon the lower end of said brackets are friction-wheels $n$, so arranged as to travel upon the cam-shaped track C, which thereby gives the proper motion to the arms.

As one or more of these is used for raking off the cut grain from the platform, it is necessary that it shall sweep in a plane corresponding with the platform of the machine, and as the reel-arms must be carried at a higher elevation to prevent their acting as rakes, a different track must be provided for them. But as the operation of raking begins very nearly where the operation of reeling ceases, it has been found to require much mechanical ingenuity to introduce any device in so small a space upon the cam-track C, and make it work with precision and continuity.

The best device of which I have any knowledge is the one shown at L, and which is simply a curved lever or switch, the tongue of which serves as the dividing rib or cam to shift the rake and reel-levers.

Figure 1:
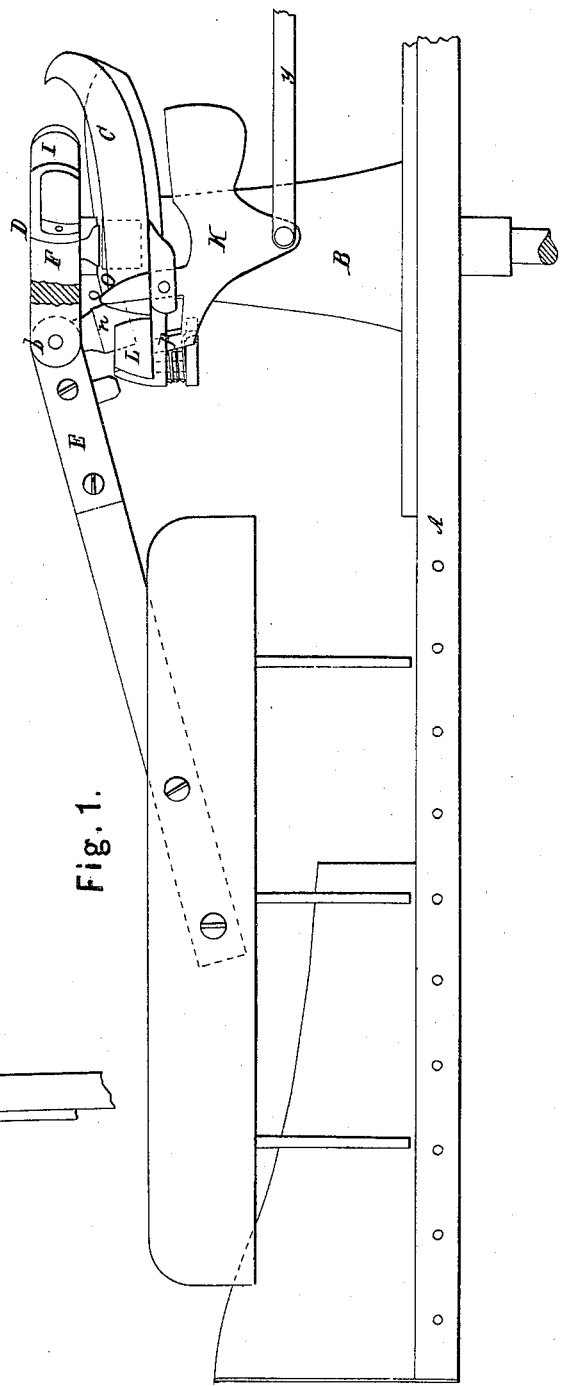
Figure 1 is a view in elevation of a portion of a harvester, showing the front edge of the finger-bar or platform of the machine and the rake-arm in the position for removing the cut grain from the platform.

This lever L is pivoted, near its center, upon the cam-track C, and is controlled in one direction by a spring around its pivot, as shown in figs. 1 and 2.

Figure 4:
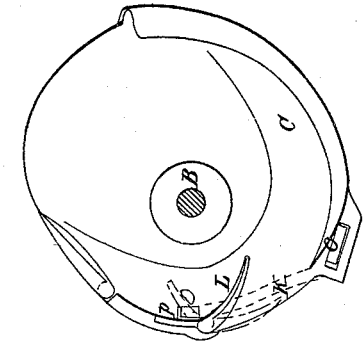
Figure 4 is a partial plan of the same track, showing the controlling device or mechanism in another position or the reverse of that shown in fig. 2.
Figure 3:
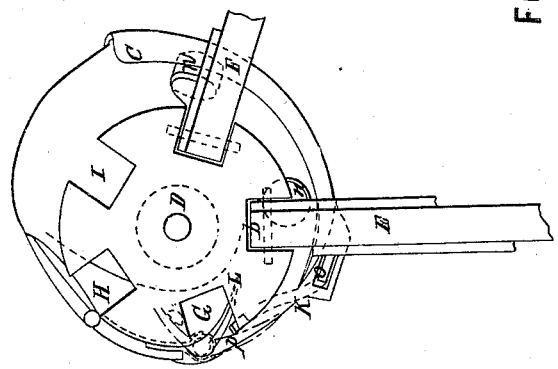
Figure 3 is a plan of the track or cam-way upon which said arms travel, showing the rake-arm as just approaching the lever that holds the gate or switch which divides the track.

If the spring is so arranged as to throw it out from the position shown at L, figs. 3 and 4, then the device K, projecting through the cam-track, will retain it until released by one of the arms, said arm being the one that serves to rake the gavel of grain from the platform.

By referring to fig. 1 at E, there is shown a projection from the bracket that is pivoted at $b$, which, as the arms revolve, comes in contact with a portion of the holding device K at $o$, and trips it so as to reverse the switch L, and permit it to quickly operate in whatever direction the spring may be arranged to move it.

As shown in the drawing, figs. 3 and 4, the switch would throw the friction-wheels $n$ outward, and thereby raise the arms from the platform, as represented at F, fig. 2. But as soon as the latch is tripped by the projection upon one or more of the arms striking the point at $o$, or by drawing the rod at $y$, which may be connected with a pedal or lever upon the main frame of the machine, the spring instantly shifts the switch L and closes the track, so that the succeeding friction-wheel $n$ will pass inside of said switch, and cause one of the arms to act as a rake traveling in a plane parallel with the platform, as shown at E, fig. 1.

But it will be observed, owing to the curved shape of the switch L, that as the friction-wheel $n$ is passing along its track, it will strike the curved end of said lever or switch, and thereby close said track, moving the switch inward, as shown at L, figs. 3 and 4, and when it is closed, the device or latch K will hold it in position until tripped by the projection on the rake-arm E, or by the operator of the machine through the rod $y$.

It is evident that said latch may hold the switch closed or open, as desired, by being placed in various positions in the cam-track, either in front of the pivot upon which the switch works, or in the rear, as shown at fig. 4, where the latch holds against the inner face of the curved portion of said switch, the effect is the same in both cases, and I have arranged them in both ways to suit the convenience of other portions of the machines, or as may be desired by various builders of such machines.

The controlling device-latch K, as represented in the drawing by the shading in blue, is precisely the form which I have made it during the past and present years, and is simply one piece of metal, having the holding and tripping projections $p$ and $o$ so combined that when one is moved the other must operate instantly or without any lost motion. But the form may be varied in some respects, and instead of the large portion which serves as a weight to hold the latch part in working position, a spring may be substituted to serve as a counter-balance or working power in reversing said device or latch.

What I claim therefore, and desire to secure by Letters Patent, is—

The device K, with its projections $p$ and $o$, when constructed to operate substantially as described, and for the purposes set forth.

WILLIAM PIMLOTT.

Witnesses:
    JOHN H. SEMMES,
    BOYD ELIOT.